US011848829B2

(12) United States Patent
Dhruvakumar et al.

(10) Patent No.: US 11,848,829 B2
(45) Date of Patent: Dec. 19, 2023

(54) MODIFYING A DATA CENTER BASED ON CLOUD COMPUTING PLATFORM USING DECLARATIVE LANGUAGE AND COMPILER

(71) Applicant: salesforce.com, inc., San Francisco, CA (US)

(72) Inventors: Srinivas Dhruvakumar, Vancouver (CA); Mayakrishnan Chakkarapani, Fremont, CA (US); Varun Gupta, Berkeley, CA (US); Joshua Paul Meier, Concord, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/091,988

(22) Filed: Nov. 6, 2020

(65) Prior Publication Data

US 2022/0150133 A1 May 12, 2022

(51) Int. Cl.
*H04L 41/18* (2022.01)
*H04L 41/50* (2022.01)
(Continued)

(52) U.S. Cl.
CPC .......... *H04L 41/18* (2013.01); *H04L 41/0806* (2013.01); *H04L 41/0893* (2013.01);
(Continued)

(58) Field of Classification Search
CPC . H04L 67/34; H04L 41/5054; H04L 41/0813; H04L 41/5064; H04L 41/104;
(Continued)

(56) References Cited

U.S. PATENT DOCUMENTS 9,380,027 B1 * 6/2016 Lian .................... H04L 63/0263
9,762,619 B1 * 9/2017 Vaidya .................... G06F 9/455
(Continued)

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.

(Continued)

*Primary Examiner* — Glenton B Burgess
*Assistant Examiner* — Rachel J Hackenberg
(74) *Attorney, Agent, or Firm* — Butzel Long

(57) ABSTRACT

Computing systems, for example, multi-tenant systems create data centers in a cloud platform using a cloud platform infrastructure language that is cloud platform independent. The system receives a cloud platform independent declarative specification describing a new datacenter to be created or modifications to an existing datacenter deployed on a cloud platform. The system compiles the cloud platform independent declarative specification to generate a metadata representation of the data center. If the datacenter is existing, the system generates a metadata representation representing modifications to the datacenter to obtain a desired datacenter. The system sends the metadata representation and a set of instructions for execution on a target cloud platform. The target cloud platform executes the instructions to configure the data center. The system provides users with access to the computing resources of the data center configured by the target cloud platform.

20 Claims, 12 Drawing Sheets

1100

Receive a modified cloud platform independent declarative specification of a previously created data center
1110

Compile the cloud platform independent declarative specification to generate a cloud platform specific detailed data center representation
1120

Access the cloud platform specific detailed data center representation of the currently deployed data center
1130

Determine a delta metadata representation as the difference between the two cloud platform specific detailed data center representations
1140

Generate instructions for modifying the data center according to the delta metadata representation
1150

Send the generated instructions for execution on the cloud platform
1160

(51) Int. Cl.
*H04L 41/0806* (2022.01)
*H04L 41/0893* (2022.01)
*H04L 9/40* (2022.01)
*H04L 67/00* (2022.01)

(52) U.S. Cl.
CPC ........ *H04L 41/5096* (2013.01); *H04L 63/104* (2013.01); *H04L 67/34* (2013.01)

(58) Field of Classification Search
CPC ............. H04L 41/4641; H04L 41/0803; H04L 41/0816; H04L 41/085; H04L 41/0866; H04L 41/0843; H04L 41/0869; H04L 41/0859; H04L 41/5025; H04L 41/508; H04L 41/0873; H04L 41/08; H04L 41/18; H04L 41/0883; H04L 41/806; H04L 41/0893; H04L 41/50; H04L 41/5096; H04L 63/104
See application file for complete search history.

(56) References Cited

U.S. PATENT DOCUMENTS

| | | | | |
|---|---|---|---|---|
| 10,924,347 | B1 * | 2/2021 | Narsian | H04L 41/0853 |
| 11,086,545 | B1 * | 8/2021 | Dayal | G06F 3/067 |
| 11,277,303 | B1 | 3/2022 | Srinivasan et al. | |
| 11,698,915 | B1 * | 7/2023 | Yao | H04L 63/10 707/602 |
| 2005/0198244 | A1 | 9/2005 | Eilam et al. | |
| 2006/0015728 | A1 | 1/2006 | Ballinger et al. | |
| 2014/0075032 | A1 * | 3/2014 | Vasudevan | H04L 41/5048 709/226 |
| 2014/0143083 | A1 * | 5/2014 | Prathipati | G06Q 30/0633 705/26.5 |
| 2017/0168797 | A1 * | 6/2017 | Pogrebinsky | G06F 8/65 |
| 2018/0356989 | A1 * | 12/2018 | Meister | G06F 11/3409 |
| 2019/0079789 | A1 * | 3/2019 | Mahkonen | G06F 21/606 |
| 2019/0095532 | A1 * | 3/2019 | Levine | G06F 16/24549 |
| 2020/0059420 | A1 * | 2/2020 | Abraham | H04L 41/0843 |
| 2020/0133688 | A1 | 4/2020 | Shinde et al. | |
| 2021/0157775 | A1 * | 5/2021 | Pickerill | G06F 8/60 |

OTHER PUBLICATIONS

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

PCT International Search Report and Written Opinion, PCT Application No. PCT/US2021/015525, dated Jul. 19, 2021, 16 pages.

United States Office Action, U.S. Appl. No. 17/091,982, dated Apr. 11, 2022, 20 pages.

* cited by examiner

Figure 6:
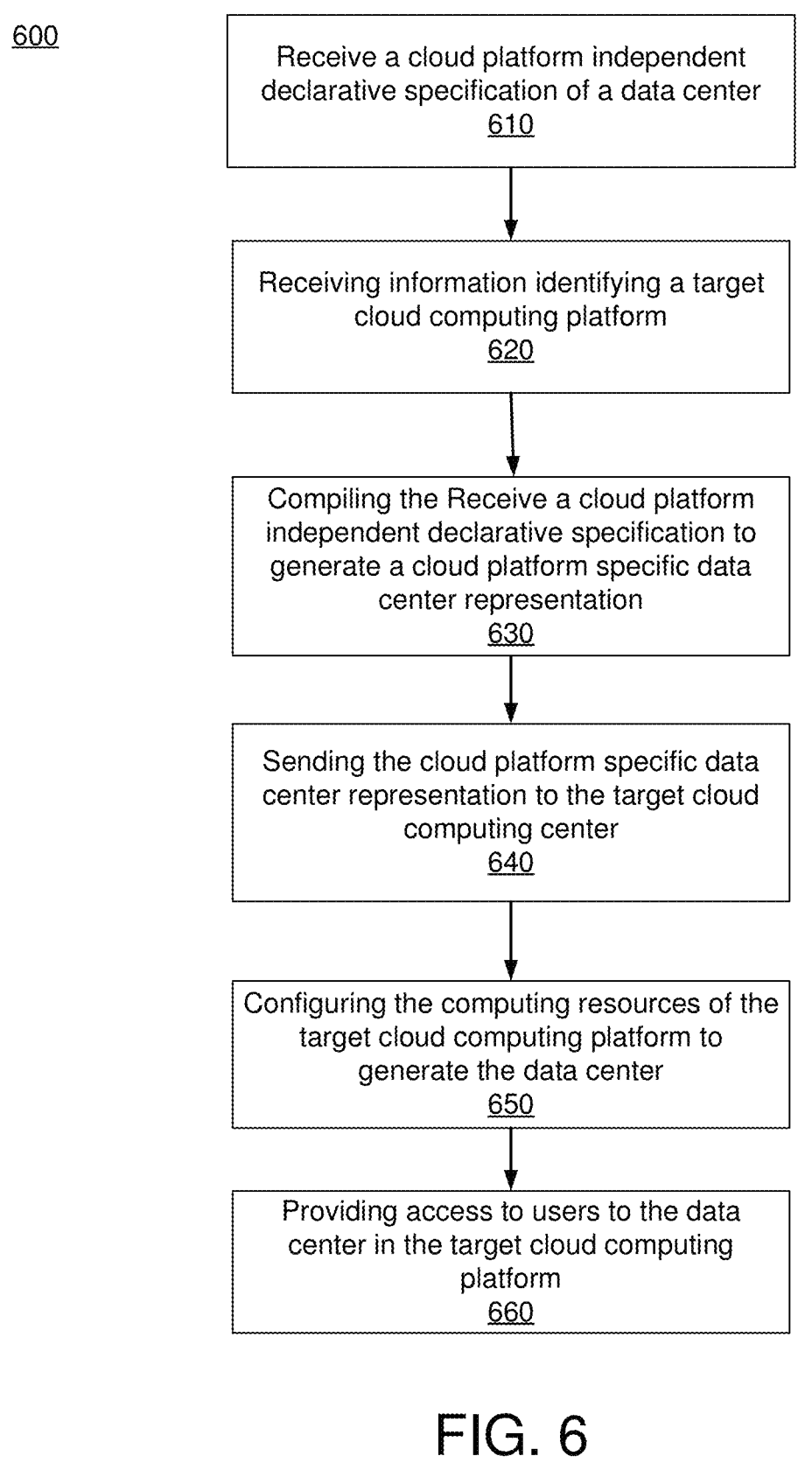

600

Receive a cloud platform independent declarative specification of a data center
610

Receiving information identifying a target cloud computing platform
620

Compiling the Receive a cloud platform independent declarative specification to generate a cloud platform specific data center representation
630

Sending the cloud platform specific data center representation to the target cloud computing center
640

Configuring the computing resources of the target cloud computing platform to generate the data center
650

Providing access to users to the data center in the target cloud computing platform
660

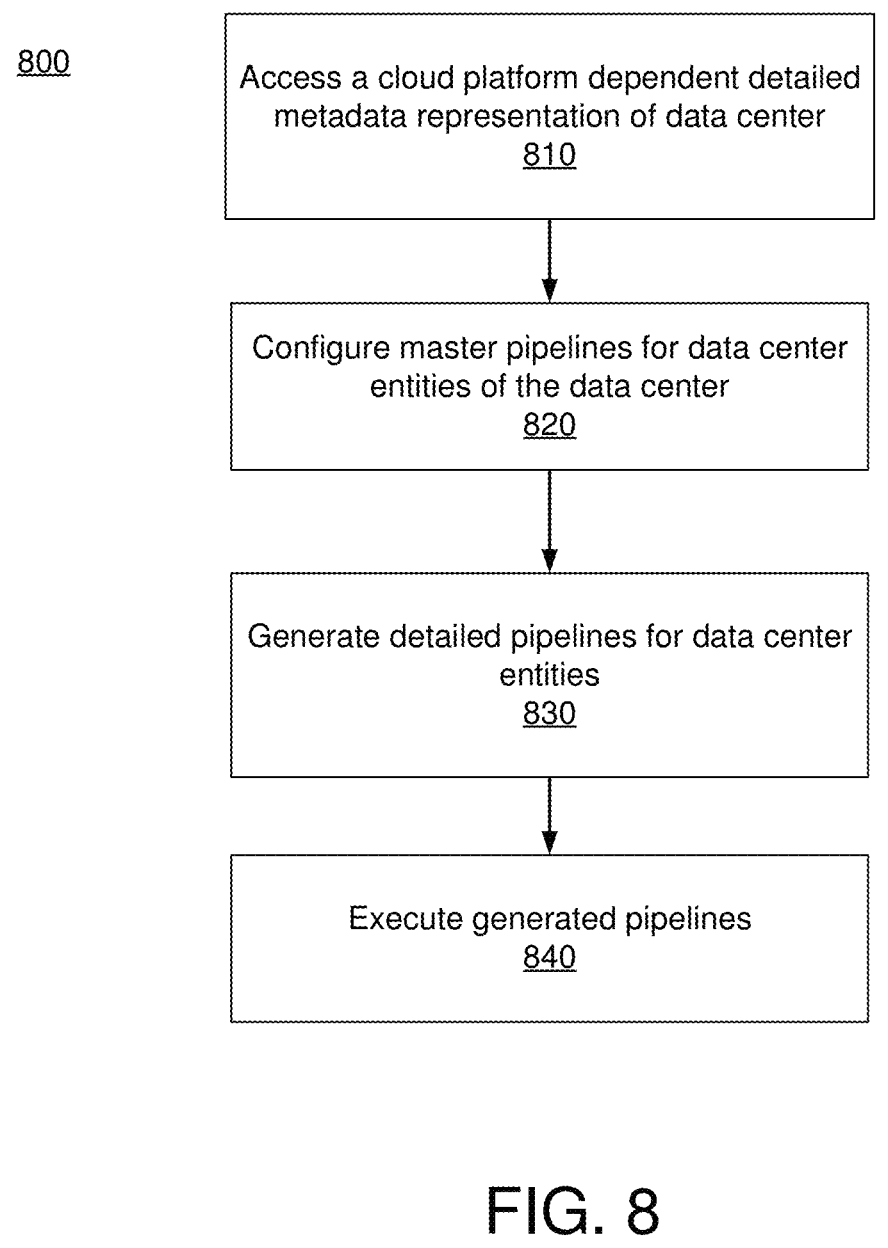

Access a cloud platform dependent detailed metadata representation of data center
810

Configure master pipelines for data center entities of the data center
820

Generate detailed pipelines for data center entities
830

Execute generated pipelines
840

FIG. 8

MODIFYING A DATA CENTER BASED ON CLOUD COMPUTING PLATFORM USING DECLARATIVE LANGUAGE AND COMPILER

BACKGROUND

Field of Art

This disclosure relates in general to cloud computing platforms, and in particular to a declarative language and compiler for creating data centers in cloud computing platforms.

Description of the Related Art

Organizations are increasingly replying on cloud computing platforms (or cloud platforms) such as AWS (AMAZON WEB SERVICES), GOOGLE cloud platform, MICROSOFT AZURE, and so on for their infrastructure needs. Cloud platforms provide servers, storage, databases, networking, software, and so on over the Internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, maintaining large data centers on a cloud platform using a continuous delivery platform can be complex. Such large data centers may require maintaining millions of lines of instructions of such platforms. Furthermore, multi-tenant systems manage data and applications for a large number of organizations representing tenants of the multi-tenant system.

A multi-tenant system may have to maintain several thousand such data centers on a cloud platform. Since each data center may require millions of lines of code, maintaining such data centers can be a complex task. Furthermore, the software, languages, features supported by each cloud platform may be different. For example, different cloud platforms may support different mechanism for implementing network policies or access control. Furthermore, network policies supported by a particular cloud platform may not be supported by another cloud platform. As a result, a multi-tenant system has to maintain different implementations of data centers, depending on the number of cloud platforms that are supported for data centers. This results in high maintenance cost for the multi-tenant system for supporting data centers across multiple cloud platforms.

BRIEF DESCRIPTION OF DRAWINGS

FIG. 6 is a flow chart illustrating the process for creating data centers on cloud platforms based on a declarative specification according to one embodiment.

FIG. 8 is a flow chart illustrating the process for deploying data centers on a cloud platform according to one embodiment.

Figure 1:
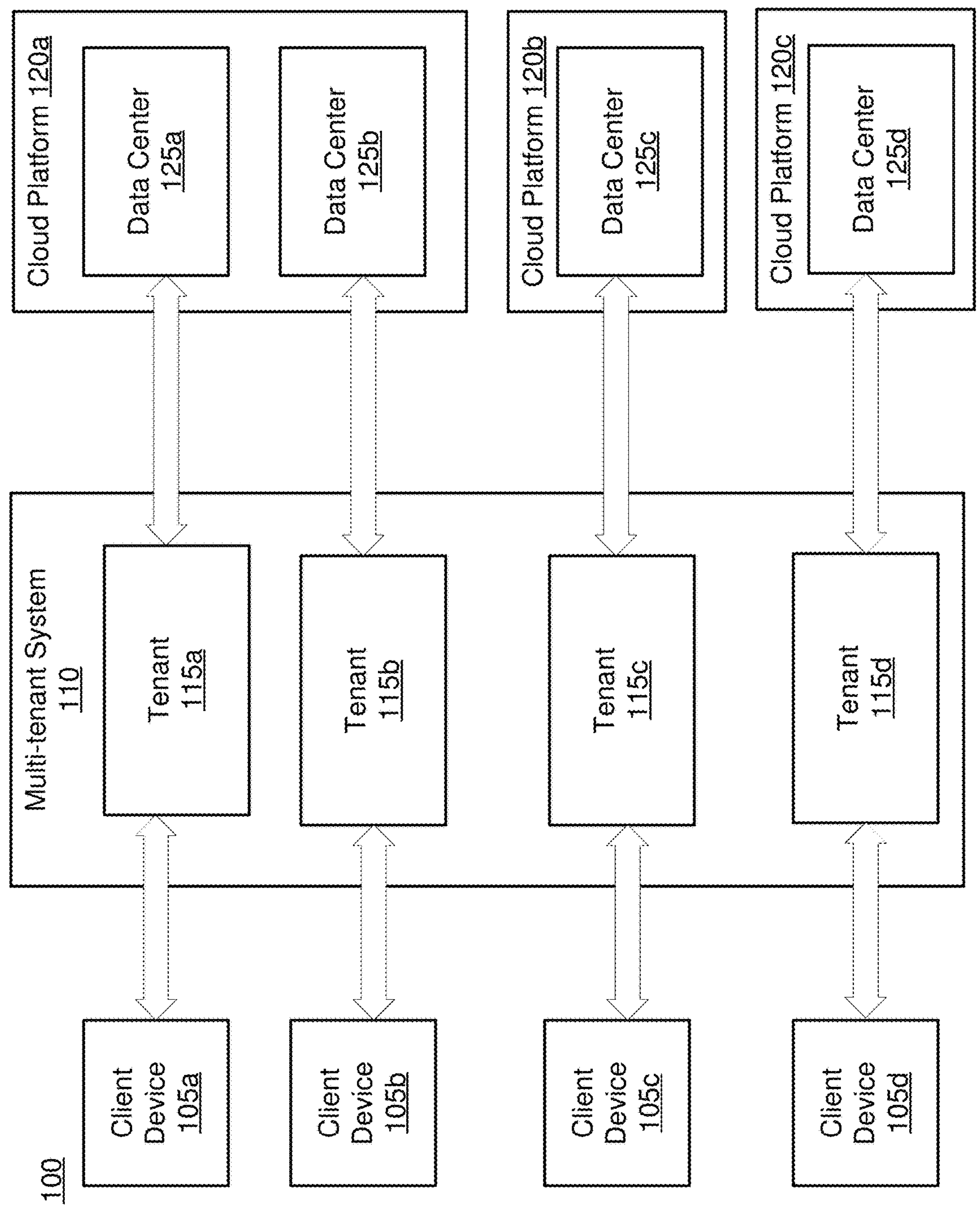
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments allow computing systems (or systems) to create data centers in a cloud platform using a cloud platform infrastructure language that is cloud platform independent. The system receives a cloud platform independent declarative specification of a data center. The declarative specification describes the data center and may not provide instructions for creating the data center. The cloud platform independent declarative specification is configured to generate the data center on any of a plurality of cloud platforms and is specified using a cloud platform infrastructure language. The system receives information identifying a target cloud platform for creating the data center. The system compiles the cloud platform independent declarative specification to generate a cloud platform specific data center representation. The system sends the platform specific data center representation and a set of instructions for execution on the target cloud platform. The target cloud platform executes the instructions to configure the data center using the platform specific data center representation. The system provides users with access to the computing resources of the data center configured by the cloud platform.

In an embodiment, the system allows modification of a data center deployed on a cloud platform based on modifications to the declarative specification describing the data center. The system creates a data center in the cloud platform based on an original version of a declarative specification. The system receives a modified declarative specification with instructions to modify the datacenter to correspond to the description specified in the modified declarative specification. The system generates a delta metadata representation representing a difference between the original version of the data center based on the original declarative specification and the modified version of the data center based on the modified declarative specification. The system generates, based on the delta metadata representation, a modification plan comprising instructions for modifying the data center on the target cloud platform to obtain the modified version of the data center. The system sends the generated instructions for execution to the target cloud platform. The target cloud platform executes the generated instructions to obtain the modified version of the data center from the original version of the data center. The system provides the set of users with access to computing resources of the modified version of the data center deployed on the target cloud platform. The datacenter may be created for a set of users associated with a tenant of a multi-tenant system. Alternatively, the set of users may be any users, for example, users of an enterprise that requested creation of the data center or users associated with any computing system that requested creation of the data center.

In an embodiment, the delta metadata representation includes nodes representing datacenter entities annotated with a type of operation associated with the datacenter entity, for example, a create operation, a delete operation, or an update operation. The modification plan may include instructions to start data center entities in an order determined based on the start dependencies specified in the delta metadata representation. If the modification plan includes instructions to delete or decommission a data center entity, the modification plan specifies an order in which other data center entities that depend on this data center entity are decommissioned in an order determined based on the dependency graph.

A cloud platform is also referred to herein as a substrate. The declarative specification of data center is substrate independent or substrate agnostic, whereas the cloud platform specific data center representation is substrate specific. If a data center is created using conventional techniques, the user has to provide cloud platform specific instructions for creating each data center entity. Accordingly, the user needs to knowledge of how to create each data center entity for a cloud platform. Furthermore, the instructions are cloud platform specific and are not portable across multiple platforms. For example, the instructions for creating a data center or a data center entity on an AWS cloud platform are different from instructions for creating the same data center or data center entity on a GCP cloud platform. A developer creating a data center on each cloud platform has to understand the details of how each data center entity and feature is implemented on that specific cloud platform. The system disclosed provides a cloud platform infrastructure language that allows users to describe the data center that they want to create in any cloud platform selected from a plurality of cloud platforms. A compiler of the cloud platform infrastructure language generates a cloud platform specific detailed metadata representation of the data center and creates the data center on a target cloud platform.

The cloud platform infrastructure language may be referred to as a domain specific language (DSL) for creating data centers. The system may represent a multi-tenant system but is not limited to multi-tenant systems and can be any online system or any computing system with network access to the cloud platform.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105. With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

A cloud platform may also be referred to as a cloud computing platform or a public cloud environment. A tenant may use the cloud platform infrastructure language to provide a declarative specification of a data center that is created on a target cloud platform 120. A tenant 115 may create one or more data centers on a cloud platform 120. A data center represents a set of computing resources including servers, applications, storage, memory, and so on that can be used by users, for example, users associated with the tenant.

The computing resources of a data center are secure and may not be accessed by users that are not authorized to access them. For example, a data center 125*a* that is created for users of tenant 115*a* may not be accessed by users of tenant 115*b* unless access is explicitly granted. Similarly, data center 125*b* that is created for users of tenant 115*b* may not be accessed by users of tenant 115*a*, unless access is explicitly granted. Furthermore, services provided by a data center may be accessed by computing systems outside the data center, only if access is granted to the computing systems in accordance with the declarative specification of the data center.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2:
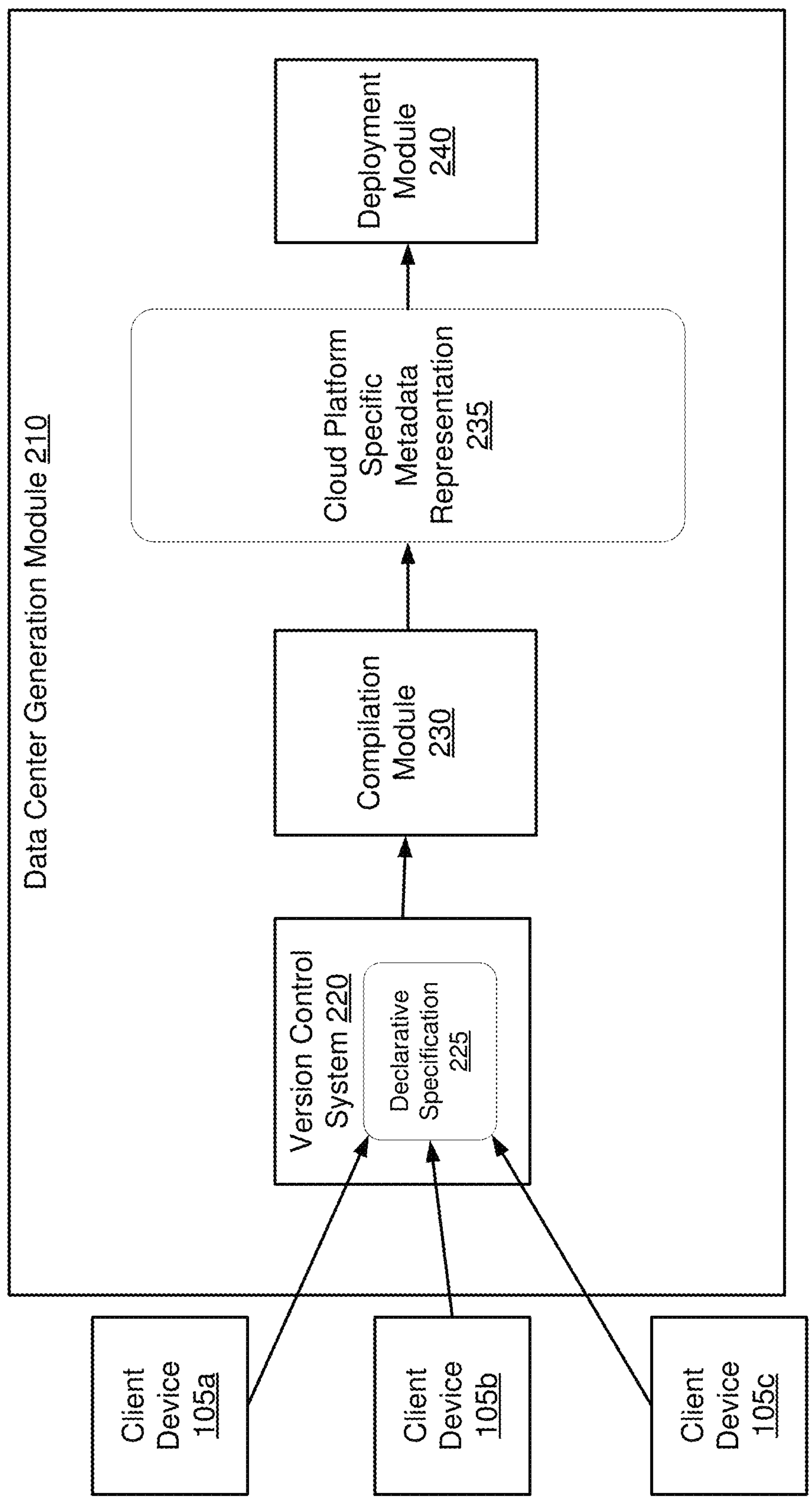
FIG. 2 is a block diagram illustrating the system architecture of a data center generation module according to an embodiment.

FIG. 2 is a block diagram illustrating the system architecture of a data center generation module according to an embodiment. The data center generation module 210 comprises a version control system 220, a compilation module 230, and a deployment module 240. Other embodiments can have different and/or other components than the ones described here, and that the functionalities can be distributed among the components in a different manner.

The version control system 220 stores one or more versions of a platform independent declarative specification 225 of a data center. The platform independent declarative specification 225 of a data center specifies various entities of the data center including the services available in the data center and their interactions. Expert users may modify the platform independent declarative specification, for example, using applications executing on client devices 105. The modifications to the platform independent declarative specification may be submitted via commit requests of the version control system 220. The version control system 220 allows users to create snapshots of the platform independent declarative specification at various stages of modifications, thereby allowing users to rollback certain changes and apply a previous version of the platform independent declarative specification.

The compilation module 230 receives the platform independent declarative specification 225 and a target cloud platform as input and generates a cloud platform specific metadata representation 235 for the target cloud platform. The architecture of the compilation module 230 and processes executed by the compilation module 230 are described in further detail herein, for example, in the description of FIG. 3. The deployment module 240 deploys the generated cloud platform specific metadata representation 235 on the target cloud platform to create a data center on the target cloud platform according to the declarative specification 225.

Figure 3:
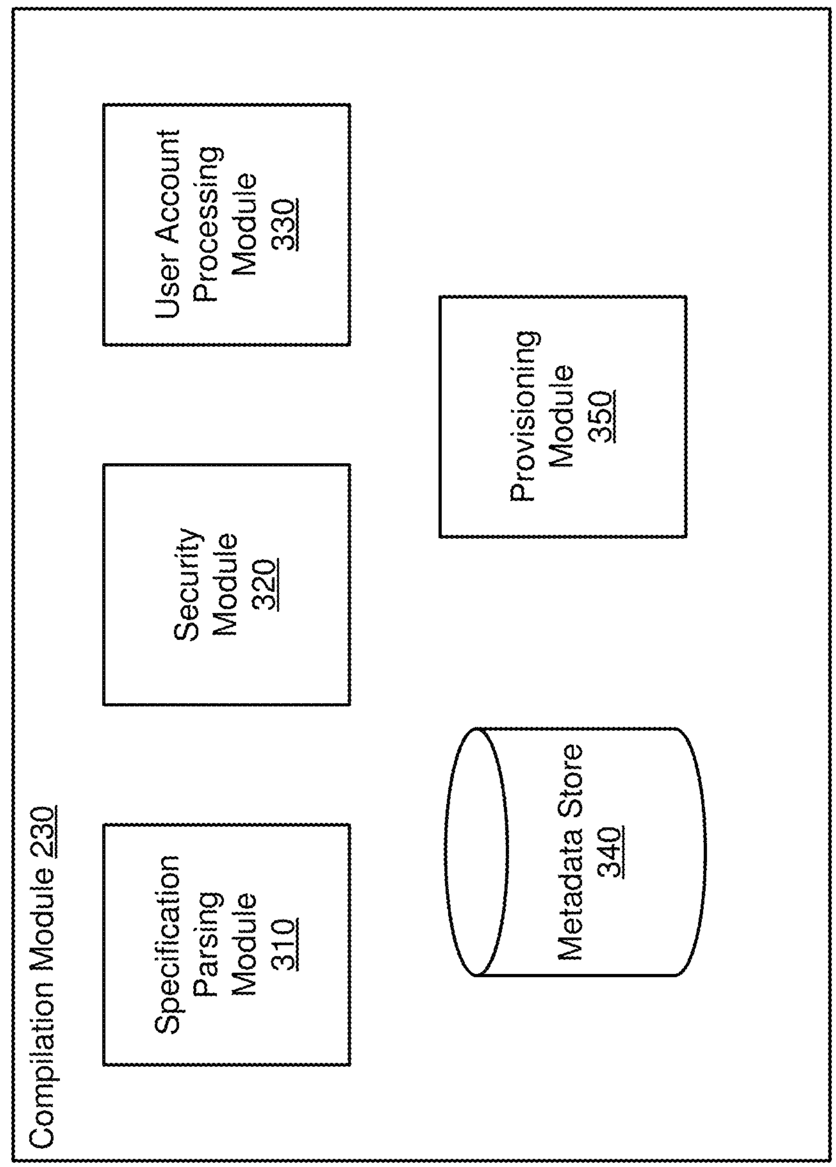
FIG. 3 is a block diagram illustrating the architecture of a compilation module according to one embodiment.

FIG. 3 is a block diagram illustrating the architecture of a compilation module according to one embodiment. The compilation module 230 includes a specification parsing module 310, a security module 320, a user account processing module 330, a metadata store 340, and a provisioning module 350. Other embodiments may include more, fewer, or different modules than those indicated herein in FIG. 3.

The specification parsing module 310 parses a declarative specification 225 of a data center received as input by the compilation module 230. The specification parsing module 310 identifies individual data center entities represented within the declarative specification 225 of the data center. The specification parsing module 310 generates data structures and metadata representations of the data center entities and provides the generated data structures and metadata representations to other modules of the compilation module 230 for further processing.

The security module 320 handles security aspects of various data center entities that are specified in the declarative specification 225 of the data center. For example, the security module 320 ensures that interactions within various data center entities, interactions of data center entities with systems outside the data center generated conform to security policies specified within the declarative specification 225 of the data center. The security policy may specify which data center entities can be accessed by external systems, which external system may be accessed by specific data center entities, whether a service can interact with another service, whether a service group can interact with another service group, whether a service can access a specific functionality or API (application programming interface) supported by the cloud platform, and so on. An external system may be identified using an IP address or domain name.

The user account processing module 330 creates user accounts in the cloud platforms where the data center is being created. These user accounts are used for various purposes, for example, for debugging, simulation of data center, for interaction with team members and so on.

The metadata store 340 stores various transformed metadata representations of data centers that are generated by the compilation module 230. The transformed metadata representations may be used for performing rollback to a previous version if an issue is encountered in a current version of the data center. The transformed metadata representations may be used for validation, auditing, governance, and so on at various stages of the transformation process.

The provisioning module 350 creates instructions for provisioning resources on target cloud systems and executes them for deploying the data center. In an embodiment, the provisioning system creates pipelines for executing on the cloud platform. The pipelines comprise stages that include instructions for provisioning services or deploying applications for creating various services on the cloud platform according to the declarative specification describing the data center.

Figure 4:
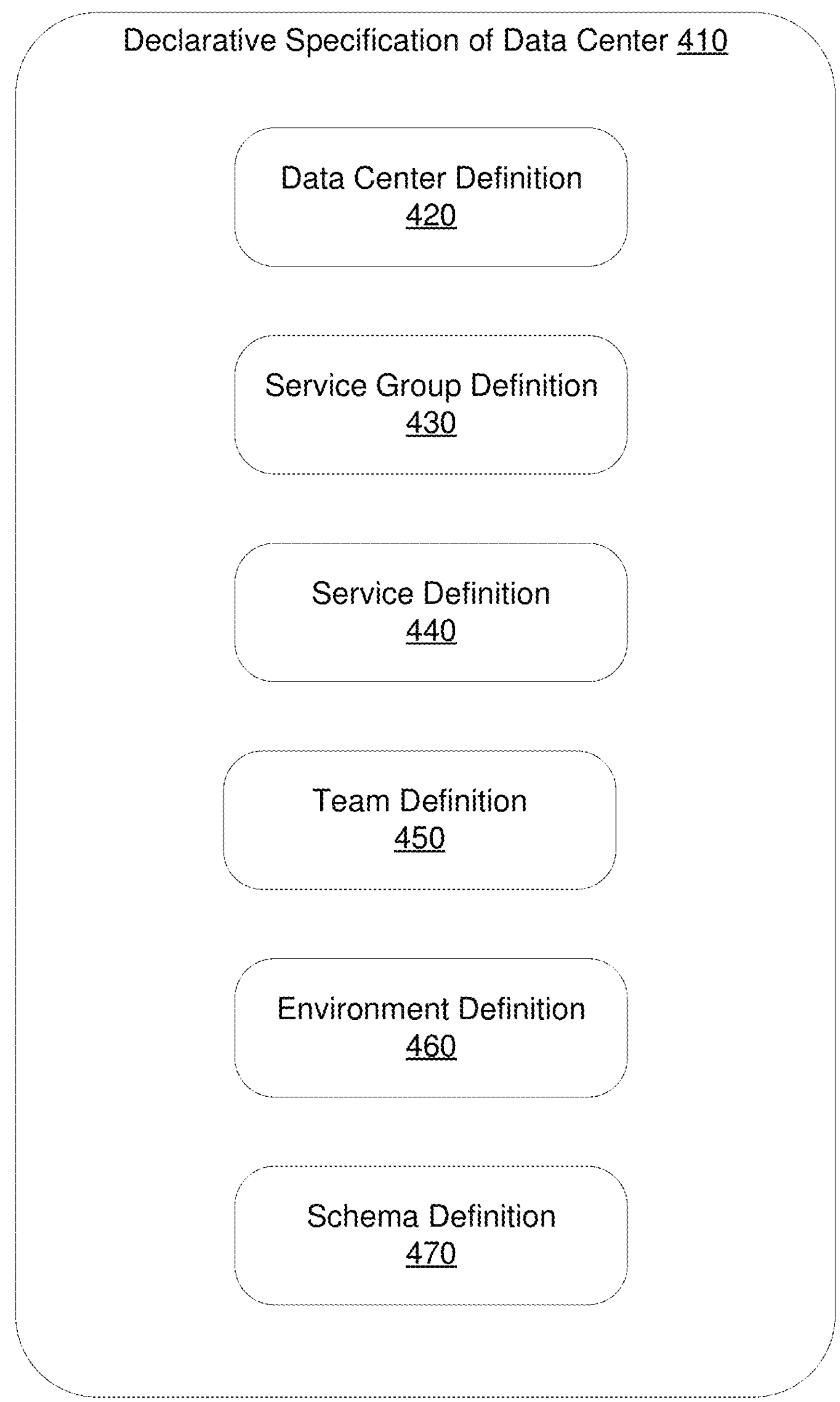
FIG. 4 illustrates an example of a data center declarative specification according to one embodiment.

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 420 represents a set of capabilities and features and services offered by one or more computing systems that can be built and delivered independently, in accordance with one embodiment. A service group may be also referred to as a logical service group, a functional unit, or a bounded context. A service group 420 may also be viewed a set of services of a set of cohesive technical use-case functionalities offered by one or more computing systems. A service group 420 enforces security boundaries. A service group 420 defines a scope for modifications. Thus, any modifications to an entity, such as a capability, feature, or service offered by one or more computing systems within a service group 420 may propagate as needed or suitable to entities within the service group, but does not propagate to an entity residing outside the bounded definition of the service group 420. A data center may include multiple service groups 420. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [],
      "description": "Service group Service Instance Definitions ",
      "service_group_id": "id1",
      "name": "name1",
      "schema_version": "1.0",
      "cluster_instances": [
        {
          "cluster_instance_name" : "cluster1",
          "cluster_type" : "cluster_type1"
          },
          {
            "cluster_instance_name": "cluster2",
            "cluster_type": "cluster_type1"
          },
          {
            "cluster_instance_name": "cluster3",
            "cluster_type": "cluster_type2"
          }
        ],
      "service_instances":[
          {
            "service_instance_name": "serviceinstance0001",
            "service_type": "servicetype1"
          },
          {
            "service_instance_name": "serviceinstance0002",
            "service_type": "servicetype1"
            "cluster_instance": "cluster1"
          },
          {
            "service_instance_name": "serviceinstance0003",
            "service_type": "servicetype2"
          },
          ...
          ],
      "service_teams": ["team1"],
      "type ": "servicetype"
      "security_groups" :[
          {
            "name": "group1",
              "policies": [
                {
                  "description":"Allow access from site S1",
                  "destination":{"groups": ["group2"]},
                  "environments":["dev", "test", "staging"],
                  "source":{
                    "iplist":"URL1",
                    "filters":[filter-expression"]
                  }
                ]
              }
          ]
        }
      ]
    }
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [],
      "build_dependencies": [],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ... ],
      "sub_services": ["service1", "service2", "service3", ...],
      "listening_ports":[
        { "protocol":"tcp", "ports":["53"] },
        { "protocol":"udp","ports":["53"] }
      "outbound access":[
          {
            "destination":[
              {
                "endpoints":[ ".xyz.com:443", ".pqr.com:443" ]
              }
            ]
          }
        ],
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group as stated by Conwoy's law. Conwoy's law states that organizations which design systems are constrained to produce designs which are copies of the communication structures of these organizations. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation 235 based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
          "datacenter_instance_identifier": "id1",
            "name": "data_center1",
            "region": "region1",
            "service_groups": [
              "service_group1",
              "service_group2",
              "service_group3",
              "service_group4",
              ...
          ],
        "schema_version": "1.0",
        "admin_team": "admins",
        ...
      }
    }
  }
}
```

Figure 5:
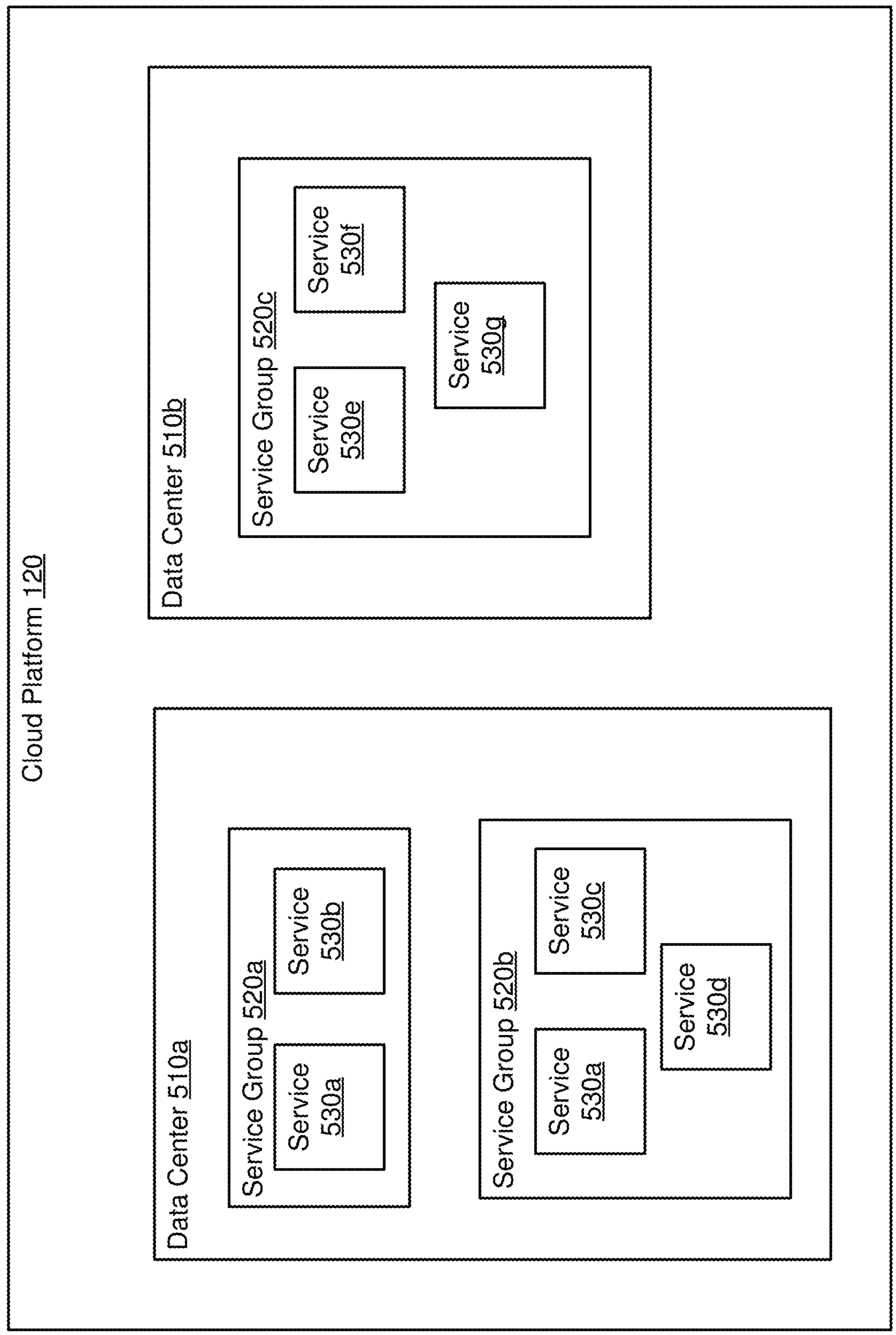
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510_a_ includes service groups 520_a_ and 520_b_ and data center 510_b_ includes service group 520_c_. A data center may include multiple instances of a particular type of service group. Each service group includes a set of services. For example, service group 520*a* includes services 530*a* and 530*b*, service group 520*b* includes services 530*a*, 530*b*, and 530*c*, and service group 520*c* includes services 530*e*, 530*f*, and 530*g*. A service group may include multiple instances of services of the same service type.

Overall Process

Figure 7:
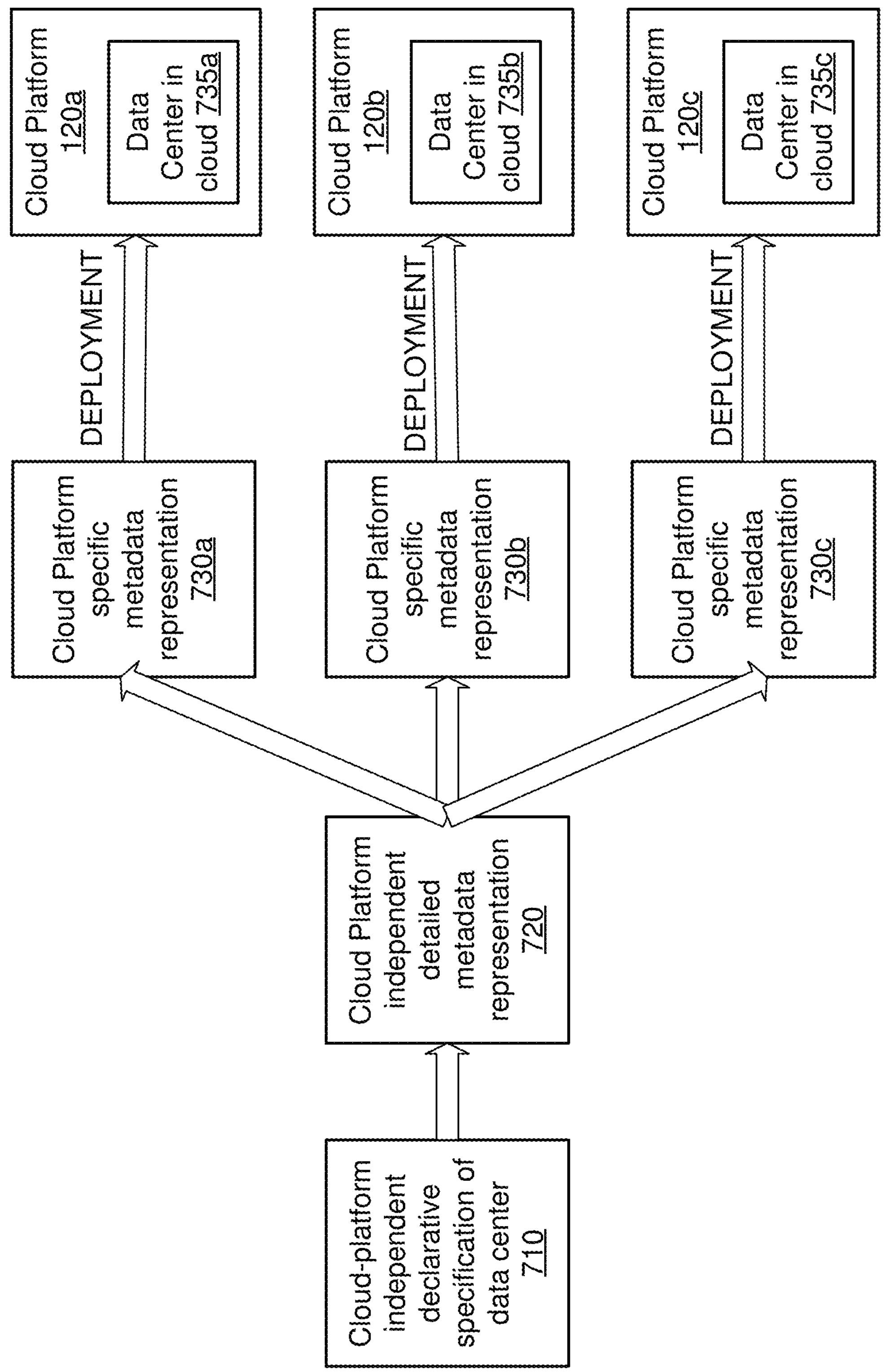
FIG. 7 is a block diagram illustrating generation of data centers on cloud platforms based on a declarative specification, according to one embodiment.

FIG. 7 is a flow chart illustrating the process for creating data centers on cloud platforms based on a declarative specification according to one embodiment. Other embodiments can perform the steps of FIG. 7 in different orders. Moreover, other embodiments can include different and/or additional steps than the ones described herein.

The data center generation module 210 receives 610 a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives 620 information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles 630 the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends 640 the platform specific data center representation along with instructions for deploying the data center on the target cloud computing platform. The target cloud computing platform executes the instructions to configure 650 the computing resources of the target cloud computing platform to generate the data center according to the platform specific data center representation. The data center generation module 210 provides 660 users with access to the computing resources of the data center configured by the cloud computing platform. For example, if the data center was created for a tenant of the multi-tenant system, users associated with the tenant are provided with access to the data center.

FIG. 7 is a block diagram illustrating generation of data centers on cloud platforms based on a declarative specification, according to one embodiment. The data center generation module 210 receives as input a cloud-platform independent declarative specification 710 (represented as the declarative specification 225 in FIG. 2). The cloud-platform independent declarative specification 710 may be a version of the declarative specification that is being incrementally modified by users. The data center generation module 210 processes a particular version of the cloud-platform independent declarative specification 710. Since cloud-platform independent declarative specification 710 is not specified for any specific target cloud platform, the data center generation module 210 can configure a data center on any target cloud platform based on the cloud-platform independent declarative specification 710.

The data center generation module 210 processes the cloud-platform independent declarative specification 710 to generate a cloud-platform independent detailed metadata representation 720 for the data center. The cloud-platform independent detailed metadata representation 720 defines details of each instance of data center entity specified in the cloud-platform independent declarative specification 710. The data center generation module 210 creates unique identifiers for data center entity instances, for example, service instances.

In an embodiment, the cloud-platform independent detailed metadata representation 720 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 720 includes attributes of each instance of data center entity. Accordingly, the description of each instance of data center entity is expanded to include all details. As a result, the cloud-platform independent detailed metadata representation 720 of a data center may be significantly larger than the cloud-platform independent declarative specification 710. For example, the cloud-platform independent declarative specification 710 may be few thousand lines of specification, whereas the cloud-platform independent detailed data center representation 320 may be millions of lines of generated code. As a result, the data center generation module 210 keeps the cloud-platform independent detailed metadata representation 720 as immutable, i.e., once the representation is finalized, no modifications are performed to the representation. For example, if any updates, deletes, or additions of data center entities need to be performed, they are performed on the cloud platform independent declarative specification 710.

The data center generation module 210 receives a target cloud platform on which the data center is expected to be provisioned and deployed and generates a cloud platform specific detailed metadata representation 730 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 720 to obtain the cloud platform specific metadata representation 730 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The data center generation module 210 deploys the cloud platform specific metadata representation 730 on the specific target cloud platform for which the representation was generated. The data center generation module 210 may perform various validations using the generated metadata representations, including policy validations, format validations, and so on.

The cloud platform independent declarative specification 710 may be referred to as a declared data center representation, cloud-platform independent detailed metadata representation 720 referred to as a derived metadata representation of the data center, and cloud platform specific metadata representation 730 referred to as a hydrated metadata representation of the data center.

Deploying a Data Center on a Cloud Platform

The target cloud platform processes the cloud-platform specific detailed metadata representation 730 to create (or configure) the data center. The data center generation module 210 generates instructions for deploying the cloud-platform specific detailed metadata representation 730 on a target cloud platform. The instructions may be represented as a pipeline comprising stages, where each stage performs certain operations related to deployment of the data center, for example, the pipelines may represent instructions of a continuous delivery platform such as SPINNAKER.

The target cloud platform may perform several steps to process the cloud-platform specific detailed metadata representation 730. For example, the cloud platform independent declarative specification may specify permitted interactions between services. These permitted interactions are specified in the cloud-platform specific detailed metadata representation 730 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The compilation module 230 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 230 creates trust relationships between user accounts that allow services to access other services via secure communication channels. These trust relationships are generated using substrate specific instructions generated based on the declarative specification, for example, based on outbound access attributes specified for services. The data center generation module 230 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 230 generates instructions, for example, pipelines for deploying the services that specifies stages that determine the order in which the services are started in a deployment.

FIG. 8 is a flow chart illustrating the process for deploying data centers on a cloud platform according to one embodiment. The data center generation module 210 accesses 810 a cloud platform specific detailed metadata representation 730 of the data center. The cloud platform specific detailed metadata representation 730 is generated from a cloud platform independent declarative specification 710, for example, as shown in FIG. 7.

The data center generation module 210 configures 820 master pipelines for data center entities of the data center. A master pipeline comprises multiple pipelines, for example, a provisioning pipeline for provisioning resources of the target cloud platform and a deployment pipeline for deploying a data center entity using the provisioned resources. Each pipeline comprises a sequence of stages, each stage representing one or more actions that need to be performed by the target cloud platform towards provisioning and deploying of the data center. The data center generation module 210 generates 830 detailed pipelines for generating specific services as specified by the cloud platform specific detailed metadata representation 730.

In an embodiment, the detailed pipelines are generated from pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

The template hydration module may access a data source, for example, a configuration file or a database to identify actual values of parameters used in templating expressions. For example, a template variable may represent a set of computing systems of a cluster. The data center generation module 230 executes 840 the generated pipelines on the target cloud platform. For example, the provisioning pipeline may be executed first to provision resources on the cloud platform and then the deployment pipelines executed to deploy applications on the provisioned resources for creating the data center on the target computing platform.

The process for generating pipelines according to one embodiment is as follows. The data center generation module 210 generates pipelines in a hierarchical fashion based on the hierarchy of the data center entities of the data center. For example, the data center comprises data center entities of different types including data centers, service groups, services, and so on. A data center entity may include one or more child data center entities. Fore example, a data center includes one or more service groups as child data center entities. A service group includes one or more services as child data center entities. Accordingly, the data center generation module 210 starts at a data center entity at a level of the hierarchy and generates pipelines of data center entities below that level. For example, the data center generation module 210 starts at the data center and generates pipelines for service groups within the data center. For each service group, the data center generation module 210 generates pipelines for services within the service group.

The generation of pipelines for an input data center entity that has a set of child data center entities is as follows. The data center generation module 210 identifies a set of child data center entities for the input data center entity. The data center generation module 210 generates a dependency graph for the set of child data center entities. For example, if the child data center entities represent services, the data center generation module 210 identifies dependency relations specified in the cloud platform specific detailed metadata representation 730 which are obtained from the cloud platform independent declarative specification 710. The data center generation module 210 analyzes the dependency graph, for example, to check for cycles in the dependency graph. If the data center generation module 210 identifies cycles in the dependency graph, the data center generation module 210 reports an error. If there are no cycles in the dependency graph, the data center generation module 210 further processes the dependency graph by performing topological sort of the dependency graph. The data center generation module 210 determines an order of the child data center entities based on the topological sort. The data center generation module 210 orders the child data center entities based on the sort order of the dependency graph. The data center generation module 210 creates a stage in the pipeline for each child data center entity arranged in the order determined for the child data center entities. The stage may be for provisioning resources for the child data center entity while generating a provisioning pipeline or the stage may be for deploying the child data center entity if a deployment pipeline is being generated.

The process for executing pipelines according to one embodiment is as follows. The data center generation module 210 receives a request to deploy a data center in the target cloud platform. The data center generation module 210 executes the aggregate pipelines for each service group of the data center. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Modification of Data Center Deployed on a Cloud Platform

Embodiments perform modification of a data center deployed in a cloud platform with minimum downtime. A modification of a data center may be performed for any data center entity, for example, a service group may be modified, a service may be modified, a team may be modified, and so on. A modification of a data center may include adding new services, decommissioning existing services, modifying configuration of existing services, and so on.

Modifications to an existing data center deployed in a cloud platform may be performed for several reasons. For example, a tenant of a multi-tenant system may build a data center incrementally. The data center initially deployed may be small with minimal set of service groups and services. Once the data center is operational and is used for an interval of time, the data center may be enhanced by adding service groups or services. This process may be continued over time to iteratively build the data center.

Modifications to an existing data center may be performed due to changes in needs of the enterprise or tenant using the data center. For example, the tenant may introduce a new functionality that requires installation of new services. There may be changes to load that may be seasonal or permanent changes. Since the use of cloud platform allows elasticity in resources used, the tenant or enterprise may modify the data center based on load changes by increasing or decreasing the cloud computing resources used.

Modifications to an existing data center may be performed due to changes in policies of the tenant or enterprise. For example, a tenant may decide to enhance security and thereby introduce new security policies. A tenant may change network policies to restrict or modify access to various services. The tenant may restrict or modify outbound access to specific services based on security concerns or based on organizational policy changes. The tenant may modify teams responsible for various data center entities in response to organizational changes. A tenant may need to add or decommission services based on monitoring of usage of services. For example, if the usage of a service is determined to be below a threshold value for more than a threshold time period, the tenant may decide to decommission that service or modify configuration of the service to account for changes in the load.

Accordingly, there may be several reasons for modifying a data center that is currently deployed in a cloud platform. Embodiments allow such dynamic modifications to an existing data center deployed in a cloud platform while minimizing disruptions to services that are currently running.

Figure 9:
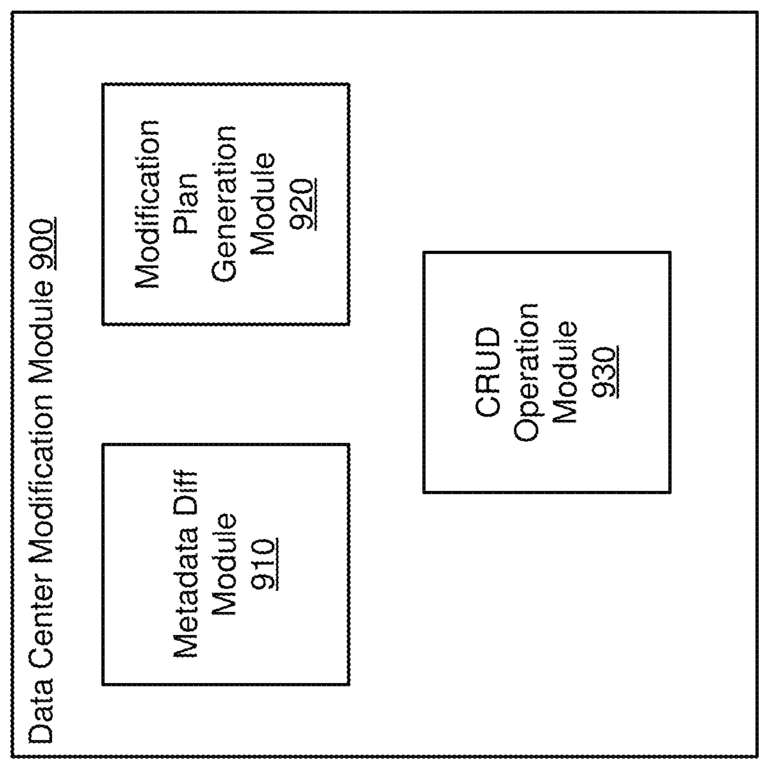
FIG. 9 is a block diagram illustrating the system architecture of a data center modification module according to an embodiment.

FIG. 9 is a block diagram illustrating the system architecture of a data center modification module according to an embodiment. The data center modification module 900 includes a metadata diff module 910, a modification plan generation module 920, and a CRUD operation module 930. Other embodiments may have more or fewer modules and functionality indicated as being performed by a module may be performed by other modules than those indicated herein.

The metadata diff module 910 determines a difference between two metadata representations of a data center. In an embodiment, the metadata diff module 910 receives a metadata representation of the data center currently deployed on a cloud platform and a metadata representation of a modified data center that is planned to be deployed and generates a delta metadata representation representing the different between the two metadata representation. The metadata diff module 910 provides the delta metadata representation to the modification plan generation module to generate a modification plan for modifying the data center currently deployed in the cloud platform to the planned data center. In an embodiment, the input metadata representations are cloud platform specific detailed metadata representations 730 but can also be cloud platform independent detailed metadata representation 720 or the cloud platform independent declarative specifications 710. In an embodiment, the metadata diff module 910 simultaneously traverses the two metadata representations in a top-down hierarchical manner and compares the nodes of the metadata representation to determine if there are matching nodes available at each level. If the metadata diff module 910 determines a mismatch in the nodes of the metadata representations, the metadata diff module 910 adds nodes to the delta metadata representation representing the difference. If there is a difference in a node N1 at a particular level, the metadata diff module 910 adds a full branch that extends from the root node to the node N1 in the generated delta metadata representation. The metadata diff module 910 also marks or annotates the nodes of the delta metadata representation with information characterizing the difference. A node in the delta metadata representation may be marked as unchanged, new, modified, or deleted.

The CRUD operation module 930 includes instructions for performing specific modifications to a data center. The operations supported by the CRUD operation module 930 are create operation, read operation, update operation, and delete operation. The create operation creates a data center entity in the data center. The read operation returns a representation of the data center or a portion of the data center. The update operation modifies an existing data center entity from the data center. And the delete operation deletes or decommissions a data center entity.

The modification plan generation module 920 receives a delta metadata representation of a data center representing a difference between a metadata representation of a data center currently deployed in a cloud platform and a metadata representation of a planned data center configuration and a generates a modification plan for modifying the data center currently deployed in the cloud platform to the planned data center configuration. In an embodiment, the modification plan generation module 920 uses annotations of the node to determine the instructions added to the modification plan. Accordingly, the modification plan generation module 920 generates (1) instructions to add a data center entity if the node in the delta metadata representation is marked as new, (2) instructions to delete a data center entity if the node in the delta metadata representation is marked as deleted, and (3) instructions to update a data center entity if the node in the delta metadata representation is marked for updating. The modification plan generation module 920 generates a plan that minimizes disruption of services to the extent possible. For example, if updating a data center entity D1 does not affect a data center entity D2, the modification plan keeps the data center entity unmodified and running while the data center entity D1 is modified.

Figure 10A:
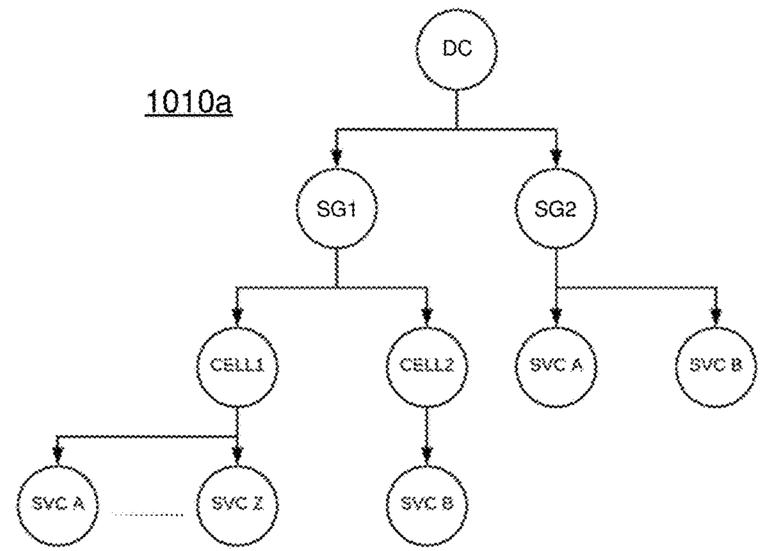
FIG. 10A shows a metadata representation a data center according to one embodiment.
Figure 10B:
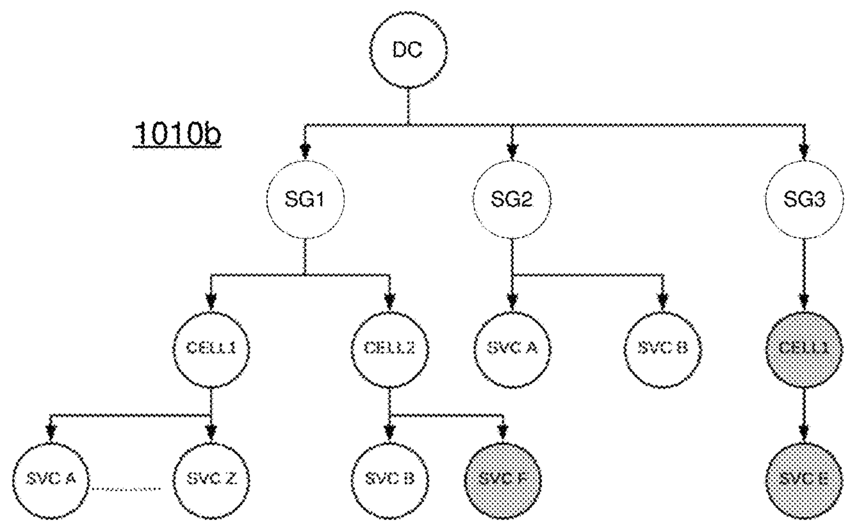
FIG. 10B shows a modified metadata representation the data center of FIG. 10A according to one embodiment.
Figure 10C:
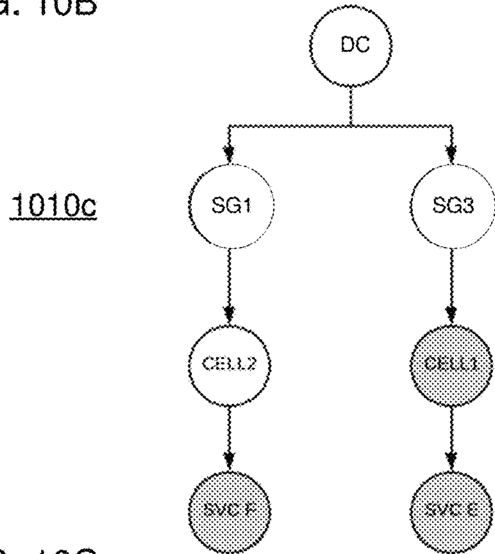
FIG. 10C shows a delta metadata representation based on a difference between the metadata representations of FIG. 10A and FIG. 10B according to one embodiment.

FIGS. 10A-C illustrate determination of a delta metadata representation of changes requested for a data center according to one embodiment. FIG. 10A shows the metadata representation 1010*a* of a datacenter that may be currently deployed in a cloud platform. As shown in FIG. 10A, a datacenter DC includes two service groups SG1 and SG2; service group SG1 includes two cells CELL1 and CELL2; CELL1 includes services SVCA, . . . , SVCZ and CELL2 includes service SVCB; service group SG2 includes two services SVCA and SVCB.

FIG. 10B includes a modified metadata representation 1010*b* of the datacenter DC. For example, a user may build a modified declarative specification by modifying a previous version of the declarative specification that corresponds to the metadata representation of FIG. 10A. The modified metadata representation 1010*b* includes in addition to the nodes of the metadata representation 1010*a*, the following nodes: a node of SVCF in cell CELL2; and a new service group SG3 that includes a cell CELL1 and a service SVCE.

FIG. 10C shows a delta metadata representation 1010*c* that represents the difference between the metadata representations 1010*a* and 1010*b*. The delta metadata representation 1010*c* includes the node DC with service groups SG1 and SG3 under the node DC; the node CELL2 under node SG1 and node SVCF under node CELL2; the node SG3 under node DC, node CELL1 under node SG3, and node SVCE under node CELL1. If a node N1 such as the node for SVCF that is different in 1010*b* compared to 1010*a* appears at a lower level, for example, a leaf level, the delta metadata representation 1010*c* includes the entire branch that includes the node N1 starting from the root node DC. Accordingly, the nodes DC, SG1, and CELL2 above the node SVCF are included even though they are not different in the metadata representations 1010*a* and 1010*b*. Furthermore, delta metadata representation 1010*c* includes a branch including SG3, CELL1, and SVCE under the node DC.

The metadata diff module 910 may obtain the delta metadata representation 1010*c* by simultaneously performing a top down traversal of the metadata representations 1010*a* and 1010*b*. For each node that matches in the two metadata representations 1010*a* and 1010*b*, the metadata diff module 910 compares the corresponding child nodes. If there is a difference in the child nodes of the node, the metadata diff module 910 determines the difference and adds corresponding nodes to the delta metadata representation 1010*c*.

For example, the metadata diff module 910 notes that the metadata representations 1010*a* and 1010*b* are identical at the root node since both have a single node DC. The metadata diff module 910 checks the child nodes of the root node in both metadata representations 1010*a* and 1010*b*. The metadata representation 1010*b* includes three nodes SG1, SG2, and SG3 under the root node DC whereas the metadata representation 1010*a* includes two nodes SG1 and SG2 under the root node DC. Accordingly, there is a different in the child nodes under the root node. The metadata diff module 910 determines the difference as the node SG3 and accordingly adds the node SG3 under the node DC in the delta metadata representation 1010*c*.

Following is an example of a portion of the delta metadata representation 1010*c* when a data center with service groups SG1 and SG2 is modified to add a new service group SG3.

```
{
  "data_center": {
    "name": "DC"
    "service_groups": [
      {
        "name": "SG3",
        "type": "SG3_type",
        ... SG3 data ...
      }
    ],
    ...
  }
}
```

Following is an example of a portion of the delta metadata representation 1010*c* when a data center with service groups SG1 with three services SVCA, SVCB, and SVCC is modified to such that the service group SG1 has four services SVCA, SVCB, SVCC, and SVCD. The delta metadata representation 1010*c* includes a node for the new service SVCD added and any other metadata relevant to service SVCD, for example, the metadata for a team for the service SVCD.

```
{
"data_center": {
"name": "DC",
    "service_groups": [
      {
        "name": "SG1",
        "service_instances": [
          {
            "service_type": "SVCD",
            ... SVCD service metadata ...
          }
        ],
```

-continued

```
        "service_teams": [
          {
            "name": "team1",
            ... service team metadata ...
          }
        ]
      }
    ]
  }
}
```

Figure 11:
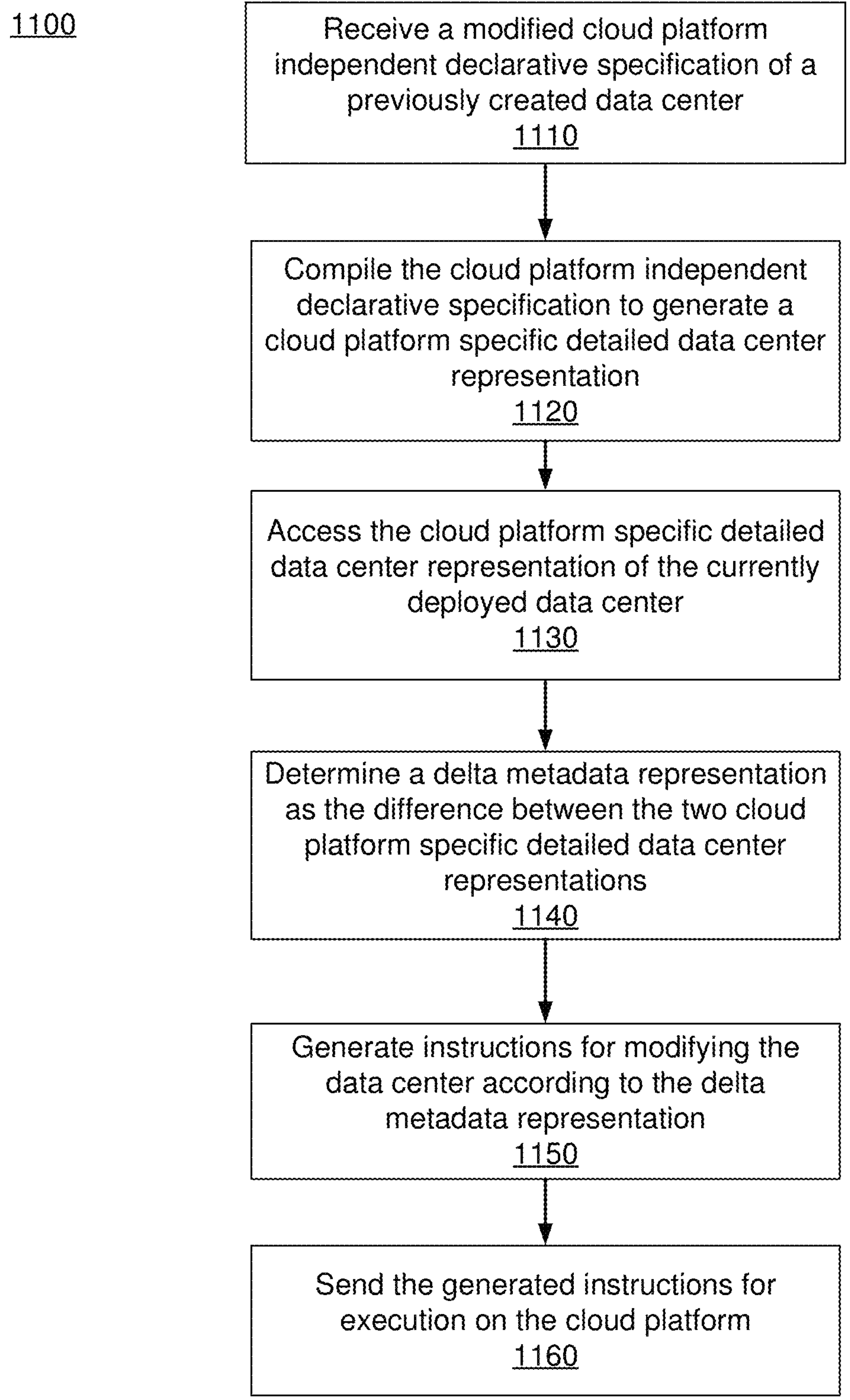
FIG. 11 is a flow chart illustrating the process for modifying a data center deployed on a cloud platform according to one embodiment.

FIG. 11 is a flow chart illustrating the process for modifying a data center deployed on a cloud platform according to one embodiment. The data center modification module 900 receives 110 a modified metadata representation of a datacenter, for example, a modified version of a cloud platform independent declarative specification of a previously created data center. The compilation module compiles 1120 the cloud platform independent declarative specification to generate a cloud platform specific detailed data center representation. The data center modification module 900 accesses 1130 the cloud platform specific detailed data center representation of the data center currently deployed in the cloud platform.

The data center modification module 900 determines 1140 a delta metadata representation as the difference between the two cloud platform specific detailed data center representations. In an embodiment, the metadata representations of the datacenter are received as a nested object structure, for example, specified as JSON objects. The data center modification module 900 processes the received structure as a graph. Each data center entity is represented as a JSON object. Certain attributes of a JSON object represent metadata attributes of the data center entity. Some attributes may represent a set of objects, for example, a dictionary representation that corresponds to child objects of the JSON object. The metadata diff module 910 determines the delta metadata by comparing metadata attributes of each nested object representing a data center entity and recursively performing the differencing process for each child object.

The data center modification module 900 generates 1150 instructions for modifying the data center according to the delta metadata representation. If the delta metadata representation 1010*c* includes a node that are marked as a new data center entity, the data center modification module 900 generates instructions to create the new data center entity. If the delta metadata representation includes a node that are marked as a deleted data center entity, the data center modification module 900 generates instructions to delete the existing data center entity. If the delta metadata representation includes a node that are marked as an updated data center entity, the data center modification module 900 generates instructions to update an existing data center entity. In an embodiment, the instructions comprise pipelines for execution on the cloud platform.

The data center modification module 900 sends the generated instructions for execution in the cloud platform. The instructions cause the datacenter to be modified to correspond to the modified version of a cloud platform independent declarative specification. The data center modification module 900 provides access to the users to any new services added to datacenter as a result of the modification.

Although the process illustrated in FIG. 11 determines a difference between two cloud platform specific detailed data center representations of a data center, the process can be performed by determining a difference between any other metadata representations of the data center, for example, cloud platform independent detailed data center representations of the data center.

If the delta metadata representation includes a node that are marked as an updated data center entity, the data center modification module 900 determines the changes performed to the data center entity and generates instructions accordingly. For example, if the update operation modifies the security policies of a service, the data center modification module 900 generates the appropriate instructions for modifying the security policies. If the update operation modifies the network policies of a service, the data center modification module 900 generates the appropriate instructions for modifying the network policies.

If the delta metadata representation includes a new relationship between two services SVCA and SVCB, the data center modification module 900 generates instructions to modify the security group definitions to allow the interaction between SVCA and SVCB and reapply the security group definitions.

If the delta metadata representation specifies changes to the port of a service from P1 to P2, the data center modification module 900 generates instructions to delete network policies and trust relationships based on port P1 since port P1 is not functional anymore. The data center modification module 900 generates instructions to add network policies and trust relationships based on port P2 as specified in the delta metadata representation.

If the delta metadata representation specifies that the outbound access to a service is changed from URL1 to URL2, the data center modification module 900 generates instructions to delete the access to URL1 and add access to URL2 for the service.

The data center modification module 900 generates instructions such that the outages to services of the datacenter are minimized when making the update and also security risk to the datacenter is minimized. For example, if any outbound or inbound accesses are modified, the generated instructions first remove access that is not needed and then add the new access, thereby ensuring that chances of unauthorized access are minimized. In an embodiment, the data center modification module 900 hierarchically traverses the datacenter representation to determine the minimum number of services that need to be shut down and restarted to perform an update operation. If a service is not required to be changed for performing an update, the data center modification module 900 leaves the service without any changes.

The data center modification module 900 analyzes dependencies of services in the delta metadata representation to determine the order in which services are started or decommissioned, depending on the type of operations that need to be performed for the data center entities.

In an embodiment, a data center entity specifies start dependency information in the declarative specification, for example, a set of other data center entities on which this data center entity depends. If a data center entity E1 has a start dependency on data center entity E2, the data center entity E2 must be started before the data center entity E1 is started. The data center modification module 900 analyzes the start dependencies of all data center entities in the delta metadata representation. The data center modification module 900 builds a dependency graph based on the start dependency information specified in the data center entities of the delta metadata representation. The data center modification module 900 generates a modification plan based on the dependency graph. In an embodiment, the data center modification module 900 generates a pipeline for starting the data center entities in an order determined based on the dependency graph.

If the delta metadata representation includes a data center entity E1 that needs to be created in the datacenter, the data center modification module 900 generates a modification plan that starts a set S1 of data center entities on which the data center entity E1 depends in an order determined based on the dependency graph such that the data center of set S1 are started before datacenter entity E1. The data center entities in the set S1 are also started in an order such that if datacenter entity Ex depends on datacenter entity Ey, the datacenter entity Ey is started before datacenter entity Ex.

If the delta metadata representation includes a data center entity E1 that needs to be deleted or decommissioned in the datacenter, the data center modification module 900 generates a modification plan that decommissions a set S1 of data center entities on which the data center entity E1 depends in an order determined based on the dependency graph such that the data center of set S1 are decommissioned after datacenter entity E1. The data center entities in the set S1 are also decommissioned in an order such that if datacenter entity Ex depends on datacenter entity Ey, the datacenter entity Ey is decommissioned after datacenter entity Ex. A datacenter entity is decommissioned when the cloud platform reclaims the computing resources used by the datacenter entity, for example, to use them for other purposes. The cloud platform also removes access to the data center entity. If the data center entity is a service, the cloud platform decommissions the service by removing access to the service and stopping the processes that execute instructions of the service.

Computer Architecture

Figure 12:
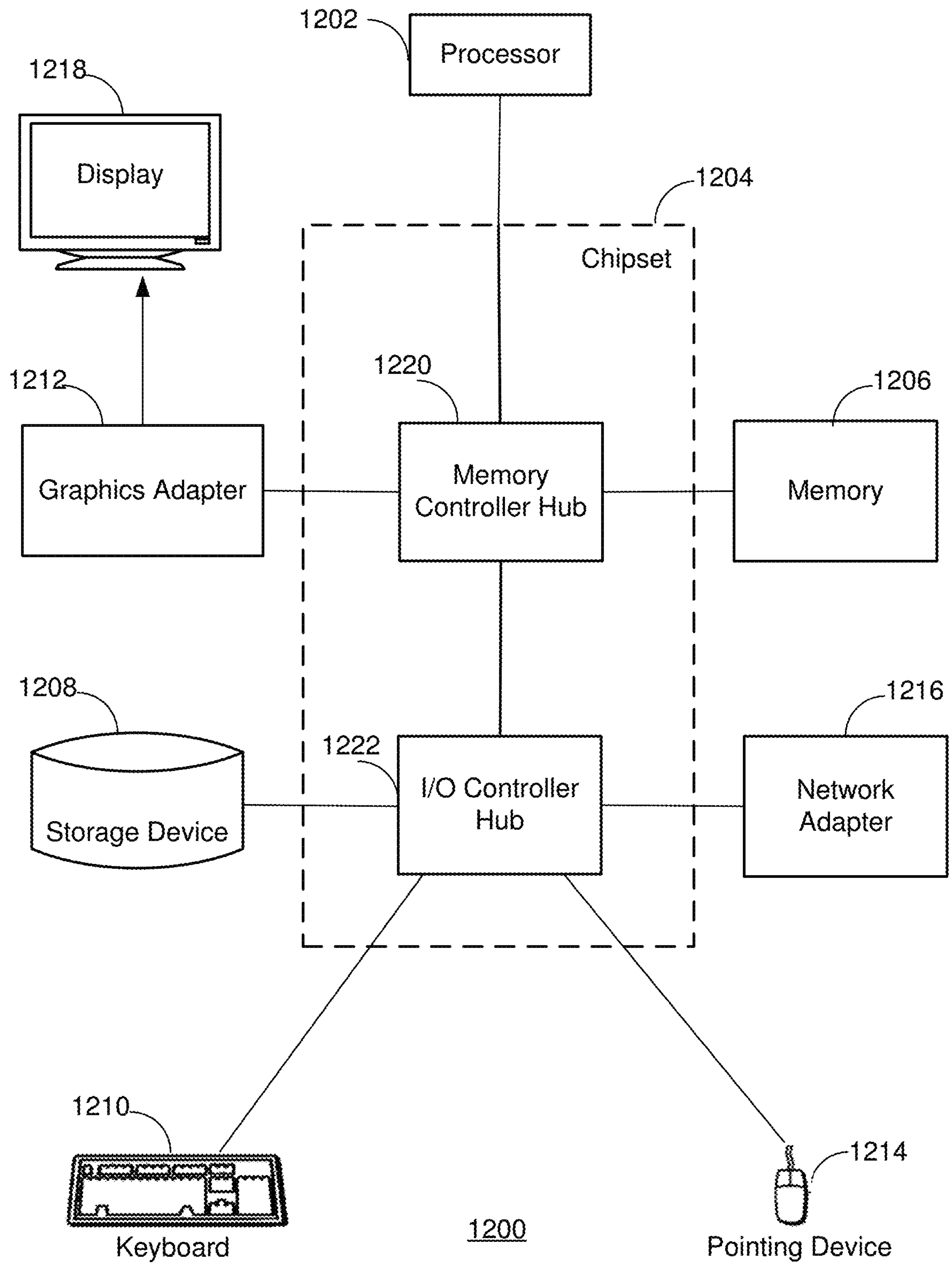
FIG. 12 is a block diagram illustrating a functional view of a typical computer system for use in the environment of FIG. 1 according to one embodiment.

FIG. 12 is a high-level block diagram illustrating a functional view of a typical computer system for use as one of the entities illustrated in the environment 100 of FIG. 1 according to an embodiment. Illustrated are at least one processor 1202 coupled to a chipset 1204. Also coupled to the chipset 1204 are a memory 1206, a storage device 1208, a keyboard 1210, a graphics adapter 1212, a pointing device 1214, and a network adapter 1216. A display 1218 is coupled to the graphics adapter 1212. In one embodiment, the functionality of the chipset 1204 is provided by a memory controller hub 1220 and an I/O controller hub 1222. In another embodiment, the memory 1206 is coupled directly to the processor 1202 instead of the chipset 1204.

The storage device 1208 is a non-transitory computer-readable storage medium, such as a hard drive, compact disk read-only memory (CD-ROM), DVD, or a solid-state memory device. The memory 1206 holds instructions and data used by the processor 1202. The pointing device 1214 may be a mouse, track ball, or other type of pointing device, and is used in combination with the keyboard 1210 to input data into the computer system 200. The graphics adapter 1212 displays images and other information on the display 1218. The network adapter 1216 couples the computer system 1200 to a network.

As is known in the art, a computer 1200 can have different and/or other components than those shown in FIG. 12. In addition, the computer 1200 can lack certain illustrated components. For example, a computer system 1200 acting as a multi-tenant system 110 may lack a keyboard 1210 and a pointing device 1214. Moreover, the storage device 1208 can be local and/or remote from the computer 1200 (such as embodied within a storage area network (SAN)).

The computer 1200 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1208, loaded into the memory 1206, and executed by the processor 1202.

The types of computer systems 1200 used by the entities of FIG. 1 can vary depending upon the embodiment and the processing power used by the entity. For example, a client device 105 may be a mobile phone with limited processing power, a small display 1218, and may lack a pointing device 1214. The multi-tenant system 110 and the cloud platform 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for modifying data centers created in a cloud platform, the method comprising:
   - receiving an original declarative specification of a data center comprising a hierarchy of data center entities, wherein the original declarative specification is cloud platform independent;
   - identifying a target cloud platform among a plurality of cloud platforms;
   - deploying, on the target cloud platform, an original version of the data center, comprising:
     - compiling the original declarative specification to generate a cloud platform specific original metadata representation for the target cloud platform; and
     - deploying the original version of the data center on the target cloud platform based on the cloud platform specific original metadata representation;
   - receiving a modified declarative specification of the data center, wherein the modified declarative specification is cloud platform independent;
   - compiling the modified declarative specification to generate a cloud platform specific modified metadata representation for the target cloud platform;
   - generating a delta metadata representation based on the original metadata representation and the modified metadata representation, the delta metadata representation associating an operation with a data center entity, the operation representing one of: a create operation, a delete operation, or an update operation;
   - generating, based on the delta metadata representation, a modification plan comprising instructions for modifying the data center on the target cloud platform;
   - sending the generated instructions for execution to the target cloud platform; and
   - providing users with access to the modified version of the data center.

2. The computer implemented method of claim 1, wherein the modified declarative specification includes one or more changes, the changes comprising one or more of:
   - a creation of a new data center entity,
   - a deletion of a data center entity, or
   - an update of a data center entity.

3. The computer implemented method of claim 1, further comprising:
   - generating a first version of the cloud platform independent detailed metadata representation of the data center from the original declarative specification; and
   - generating a second version of the cloud platform independent detailed metadata representation of the data center from the modified declarative specification.

4. The computer implemented method of claim 3, wherein the delta metadata representation represents a difference between the original version of the cloud platform independent detailed metadata representation and the second version of the cloud platform independent detailed metadata representation.

5. The computer implemented method of claim 1, wherein the cloud platform independent declarative specification comprises definitions of one or more data center instances, each data center instance including one or more service groups, wherein each service group comprises a set of services.

6. The computer implemented method of claim 1, wherein the generated instructions comprise one or more pipelines, each pipeline comprising a sequence of stages, each stage performing one or more actions for creating the data center on the cloud platform.

7. The computer implemented method of claim 1, wherein generating the modification plan comprises determining a minimum set of services that need to be restarted for modifying the data center and generating instructions that limit the restart to the minimum set of services.

8. The computer implemented method of claim 1, wherein the delta metadata representation includes a new data center entity being added to the data center, the method further comprising:
   - determining a set of data center entities on which the data center entity has start dependencies; and
   - wherein the modification plan includes instructions to start the data center entities of the set before starting the data center entity.

9. The computer implemented method of claim 1, wherein the delta metadata representation includes a data center entity being deleted from the data center, the method further comprising:
   - determining a set of data center entities on which the data center entity has start dependencies; and
   - wherein the modification plan includes instructions to delete the data center entity before the data center entities of the set.

10. The computer implemented method of claim 1, wherein the delta metadata representation includes a service of the data center being updated to have a second outbound access instead of a first outbound access, each of the first outbound access and second outbound access specifying a URL (uniform resource locator), wherein the modification plan includes instructions to update network policies in the target cloud platform to allow the service to access the URL of the second outbound access and disable access of the service to the URL of the first outbound access.

11. The computer implemented method of claim 1, wherein the delta metadata representation includes a first service adding access to a second service, wherein the modification plan includes instructions to update network policies in the target cloud platform to allow the second service to interact with the first service.

12. A non-transitory computer readable storage medium for storing instructions that when executed by a computer processor cause the computer processor to perform steps comprising:

receiving an original declarative specification of a data center comprising a hierarchy of data center entities, wherein the original declarative specification is cloud platform independent;

identifying a target cloud platform among a plurality of cloud platforms;

deploying, on the target cloud platform, an original version of the data center, comprising:

compiling the original declarative specification to generate a cloud platform specific original metadata representation for the target cloud platform; and deploying the original version of the data center on the target cloud platform based on the cloud platform specific original metadata representation;

receiving a modified declarative specification of the data center, wherein the modified declarative specification is cloud platform independent;

compiling the modified declarative specification to generate a cloud platform specific modified metadata representation for the target cloud platform;

generating a delta metadata representation based on the original metadata representation and the modified metadata representation, the delta metadata representation associating an operation with a data center entity, the operation representing one of: a create operation, a delete operation, or an update operation;

generating, based on the delta metadata representation, a modification plan comprising instructions for modifying the data center on the target cloud platform;

sending the generated instructions for execution to the target cloud platform; and providing users with access to the modified version of the data center.

13. The non-transitory computer readable storage medium of claim 12, further comprising, compiling the cloud platform independent declarative specification to generate a cloud platform specific data center representation, the compiling comprising:

generating a first version of the cloud platform independent detailed metadata representation of the data center from the original declarative specification; and generating a second version of the cloud platform independent detailed metadata representation of the data center from the modified declarative specification.

14. The non-transitory computer readable storage medium of claim 12, wherein generating the modification plan comprises determining a minimum set of services that need to be restarted for modifying the data center and limiting the restart to the determined minimum set of services.

15. The non-transitory computer readable storage medium of claim 12, wherein the delta metadata representation includes a new data center entity being added to the data center, the instructions further causing the processor to perform steps comprising:

determining a set of data center entities on which the data center entity has start dependencies; and wherein the modification plan includes instructions to start the data center entities of the set before starting the data center entity.

16. The non-transitory computer readable storage medium of claim 12, wherein the delta metadata representation includes a data center entity being deleted from the data center, the instructions further causing the processor to perform steps comprising:

determining a set of data center entities on which the data center entity has start dependencies; and wherein the modification plan includes instructions to delete the data center entity before the data center entities of the set.

17. The non-transitory computer readable storage medium of claim 12, wherein the delta metadata representation includes a service of the data center being updated to have a second outbound access instead of a first outbound access, each of the first outbound access and second outbound access specifying a URL (uniform resource locator), wherein the modification plan includes instructions to update network policies in the target cloud platform to allow the service to access the URL of the second outbound access and disable access of the service to the URL of the first outbound access.

18. A computer system comprising:

a computer processor; and a non-transitory computer readable storage medium for storing instructions that when executed by the computer processor, cause the computer processor to perform steps for configuring data centers in a cloud platform, the steps comprising;

receiving an original declarative specification of a data center comprising a hierarchy of data center entities, wherein the original declarative specification is cloud platform independent;

identifying a target cloud platform among a plurality of cloud platforms;

deploying, on the target cloud platform, an original version of the data center, comprising:

compiling the original declarative specification to generate a cloud platform specific original metadata representation for the target cloud platform; and deploying the original version of the data center on the target cloud platform based on the cloud platform specific metadata representation;

receiving a modified declarative specification of the data center, wherein the modified declarative specification is cloud platform independent;

compiling the modified declarative specification to generate a cloud platform specific modified metadata representation for the target cloud platform;

generating a delta metadata representation based on the original metadata representation and the modified metadata representation, the delta metadata representation associating an operation with a data center entity, the operation representing one of: a create operation, a delete operation, or an update operation;

generating, based on the delta metadata representation, a modification plan comprising instructions for modifying the data center on the target cloud platform;

sending the generated instructions for execution to the target cloud platform; and providing users with access to the modified version of the data center.

19. The computer system of claim 18, wherein the delta metadata representation includes a data center entity being deleted from the data center, the instructions further causing the processor to perform steps comprising:

determining a set of data center entities on which the data center entity has start dependencies; and wherein the modification plan includes instructions to delete the data center entity before the data center entities of the set.

20. The computer system of claim 18, wherein the delta metadata representation includes a new data center entity being added to the data center, the instructions further causing the processor to perform steps comprising:

determining a set of data center entities on which the data center entity has start dependencies; and wherein the modification plan includes instructions to start the data center entities of the set before starting the data center entity.

* * * * *